United States Patent [19]

Matsumura

[11] Patent Number: 5,270,790
[45] Date of Patent: Dec. 14, 1993

[54] MOVING REFLECTOR DRIVING PART OF A MICHELSON INTEFEROMETER

[75] Inventor: Takashi Matsumura, Gyoda, Japan

[73] Assignee: Advantest Corporation, Tokyo, Japan

[21] Appl. No.: 778,947

[22] PCT Filed: Apr. 7, 1991

[86] PCT No.: PCT/JP91/00506

§ 371 Date: Dec. 17, 1991

§ 102(e) Date: Dec. 17, 1991

[87] PCT Pub. No.: WO91/16606

PCT Pub. Date: Oct. 31, 1991

[30] Foreign Application Priority Data

Apr. 18, 1990 [JP] Japan .................. 2-102336

[51] Int. Cl.$^5$ .............................. G01B 9/02
[52] U.S. Cl. .................... 356/346; 356/356; 250/237 G
[58] Field of Search ............ 356/345, 346, 356; 250/237 G

[56] References Cited

U.S. PATENT DOCUMENTS

| 4,132,940 | 11/1983 | Fletcher et al. | 356/346 |
| 4,413,908 | 11/1983 | Abrams et al. | 356/346 |
| 4,575,246 | 3/1985 | Nishizawa et al. | 356/346 |
| 4,660,979 | 4/1987 | Muething | 256/345 |
| 4,799,001 | 1/1989 | Burch | 356/346 |

FOREIGN PATENT DOCUMENTS

| 504009 | 9/1985 | European Pat. Off. |
| 0335533 | 3/1989 | European Pat. Off. |
| 53-24594 | 7/1978 | Japan |
| 53-124456 | 10/1978 | Japan |
| 59-163525 | 9/1984 | Japan |
| 61-234318 | 10/1986 | Japan |
| 62-103531 | 5/1987 | Japan |
| 1-253620 | 10/1989 | Japan |
| 1185037 | 3/1966 | United Kingdom |

OTHER PUBLICATIONS

Carli et al., "Submillimeter high-resolution FT spectrometer for atmospheric studies", Applied Optics, vol. 23, No. 15, pp. 2594–2603, Aug. 1984, New York.

Sanderson et al., "High Resolution Far Infrared Interferometer", Applied Optics, vol. 10, No. 5, pp. 1097–1102, May 1971, New York.

Hochheimer et al., "A Fourier Transform Spectrometer for the 10–10,000 cm$^{-1}$ Spectral Region", Applied Optics, vol. 8, No. 3 pp. 557–562, Mar. 1969, New York.

Primary Examiner—Samuel A. Turner
Attorney, Agent, or Firm—Staas & Halsey

[57] ABSTRACT

Reference light is incident to a Michelson interferometer, in which is obtained a reference interference electric signal which undergoes a sinusoidal variation in accordance with interference of reference light as a movable reflector (14) moves. A direction control signal indicating the direction in which to move the movable reflector (14) is applied from a control circuit (21) to a two-phase signal generator (32B), which derives, from the reference interference electric signal, two-phase signals either one of which leads the other by a phase angle of 90° in accordance with the specified direction. The two-phase signals are fed back to a servo drive circuit (19) and a movement control signal is also applied from the control circuit (21) to the servo drive circuit (19) to control the movement of the movable reflector (14). Thus, the movement of the movable reflector can be controlled with a high degree of accuracy corresponding to the accuracy of the wavelength resolution of the reference light.

4 Claims, 4 Drawing Sheets the optical path from the beam splitter 12 to the fixed reflector 13 thence back to the beam splitter 12 and the optical path from the beam splitter 12 to the movable reflector 14 thence back to the beam splitter 12 is an even multiple (including 0) or odd multiple of the half wavelength of the light to be measured 11. Accordingly, when the movable reflector 14 is moved at a constant speed, the intensity of the interference light undergoes a sinusoidal change with a period corresponding to the wavelength. In the case of the light 11 containing a plurality of wavelength, a waveform containing frequency components corresponding to the wavelengths is detected by the photodetector 15 as the movable reflector 14 moves at a fixed speed.

MOVING REFLECTOR DRIVING PART OF A MICHELSON INTEFEROMETER

TECHNICAL FIELD

The present invention relates to a Michelson interferometer which is used, for example, in an optical spectrum analyzer, for generating interference light of a frequency corresponding to the wavelength of light to be measured and, more particularly, to a moving reflector driving part of the Michelson interferometer.

BACKGROUND ART

FIG. 1 shows a conventional Michelson interferometer. Light to be measured 11 is incident to a beam splitter 12 such as a semitransparent mirror, by which it is split into reflected light and transmitted light at a 1:1 power rate, and the reflected light is incident to a fixed reflector 13. The fixed reflector 13 is a reflector which reflects the incident light back to its incoming direction, such as a mirror or corner-cube prism. The transmitted light through the beam splitter 12 is incident to a movable reflector 14. The movable reflector 14 is also to reflect the incident light back to its incoming direction as is the case with the fixed reflector 13. The reflected light from the fixed reflector 13 and the reflected light from the movable reflector 14 return to the beam splitter 12, wherein they are combined and interfere with each other, and the resulting interference light is received by a photodetector and converted into an electric signal. The movable reflector 14 mounted on a linear motor 16 moves toward and away from the beam splitter 12. On the linear motor 16 there is mounted a linear scale 17 which extends in the direction of movement of the linear motor 16, and the movement of the linear scale 17 per unit length is detected by a linear scale detector 18. Its detected output is a pair of two-phase pulse signals $D_1$ and $D_2$ displaced 90° apart in phase and the direction of movement of the linear scale 17 is indicated by which signal leads or lags in phase and one pulse is generated per unit distance. Such a combination of a linear scale and a detector is now commercially available. The two-phase output signal of the linear scale detector 18 is applied to a servo drive circuit 19. The servo drive circuit 19 has a microcomputer, which is supplied with a value of desired speed, desired distance and direction of movement of the linear scale 17 from a control circuit 21 and effects drive control of the linear motor 16 accordingly. Such a servo drive circuit is also commercially available. The linear motor 16 has a light blocking plate 22, and when the linear motor 16, i.e. the movable reflector 14 reaches a reference position, the light blocking plate 22 enters into a photo interruptor 23, which supplies the control circuit 21 with a signal indicating that the linear motor 16, that is, the movable reflector 14 is at the reference position. Setting the speed, distance and direction of movement of the linear motor 16 in the servo drive circuit 19 by the control circuit 21 in response to the signal from the photo interruptor 23, the servo drive circuit 19, to which the detected signal $D_1$ and $D_2$ from the linear scale detector 18 are fed back, servo-drives the linear motor 16 with a two-phase drive signal P so that the movable reflector 14 moves at a specified constant speed by a specified distance in a specified direction.

In the case of single-wavelength light, the intensity of interference light becomes maximum or minimum (zero) depending on whether the difference between In the conventional interferometer shown in FIG. 1, the distance and direction of movement of the movable reflector 14 are detected by the linear scale 17 and the movement of the linear motor 16 is controlled step by step or stepwise every quarter period of the detected two-phase signal; therefore, if the moving step of the movable reflector 14, that is, the length corresponding to the quarter period of the two-phase signal is large, the intensity of the interference light of the light being measured varies stepwise with the step-by-step feed of the movable reflector 14, resulting in undesirable modulation noise getting mixed into the signal which is detected by the photodetector 15.

To avoid such a problem, it is necessary to move the movable reflector 14 as smoothly as possible, i.e. with the shortest possible steps. This calls for a 1 μm or less resolution of the linear scale 17 but such a high-resolution linear scale is appreciably expensive at present. Moreover, the use of such a high-resolution linear scale would require severe alignment in angle and position between it and the linear scale detector 18 and hence would involve troublesome adjustment therefor.

DISCLOSURE OF THE INVENTION

It is therefore an object of the present invention to provide a Michelson interferometer which uses low-cost parts and permits short-step movement of the movable reflector.

According to the present invention, in the Michelson interferometer of the type utilizing reference light in combination with light to be measured, an interference signal of the reference light is converted by a photodetector into an electric signal and a feedback signal, derived from the electric signal and a direction control signal for the movable reflector, is supplied to a servo drive circuit for the movable reflector.

BEST MODE FOR CARRYING OUT THE INVENTION

Figure 1:
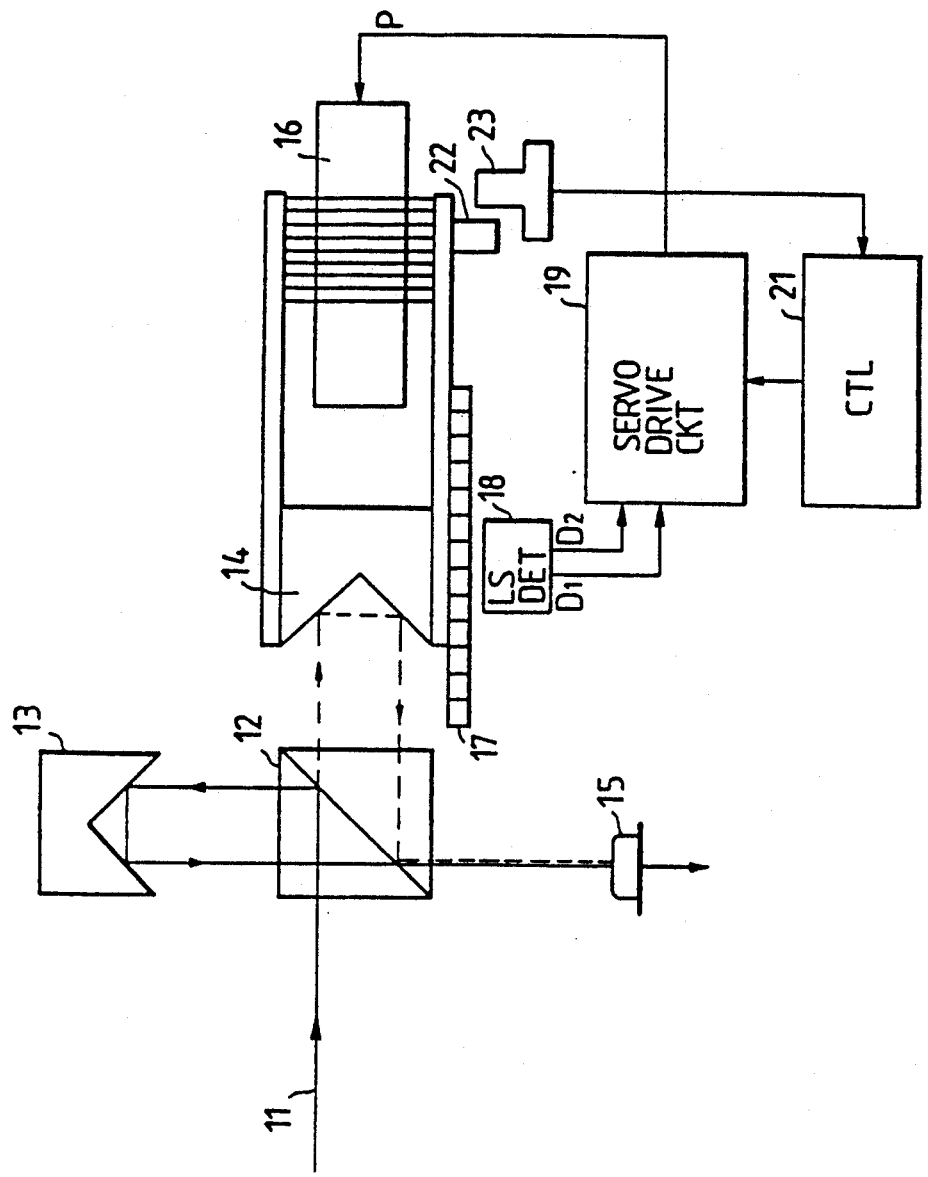
FIG. 1 is a block diagram showing a conventional interferometer using a linear scale.
Figure 2:
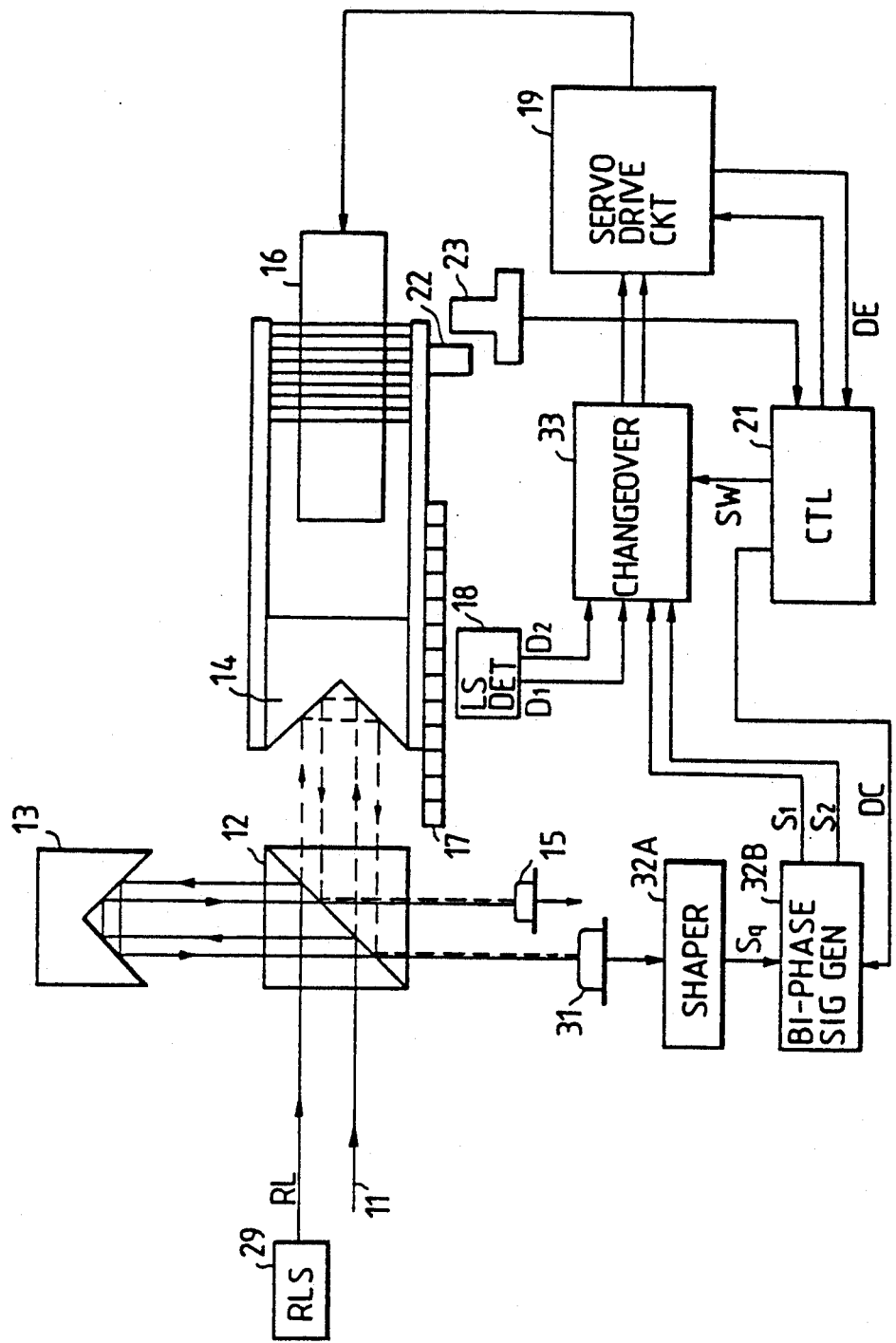
FIG. 2 is a block diagram illustrating an embodiment of the present invention.

FIG. 2 illustrates in block form an embodiment of the present invention, in which parts corresponding to those in FIG. 1 identified by the same reference numerals. In the present invention, single-wavelength reference light RL from a reference light source 29 as well as the light to be measured 11 are incident to the beam splitter 12, by which the reference light RL is split into two beams, one of which is reflected by the movable reflector 14 and the other of which is reflected by the fixed reflector 13. These two split light beams are combined by the beam splitter 12 into interference light, which is incident to a photodetector 31. Since the optical path difference between the two split light beams is $2d$ with respect to the distance of travel $d$ of the movable reflector 14, the output level of the photodetector 31 varies one cycle each time the movable reflector 14 moves a distance corresponding to one-half of the wavelength $\lambda_r$ of the reference light RL, that is, $[_r/2$. Consequently, the number of cycles over which the level of the output signal from the photodetector 31 changes corresponds to the distance of travel of the movable reflector 14. When the movable reflector 14 moves at a fixed speed, the photodetector 31 yields a sinusoidal signal of a fixed period dependent on the wavelength of the reference light RL and the speed of travel of the reflector 14. Thus, the frequency of the output signal from the photodetector 31 provides a measurement standard to the signal frequency based on the interference light of the light to be measured 11 which is detected by the photodetector 15. It is preferable that the wavelength of the reference light RL be equal to or shorter than the wavelength of the light 11, because the shorter the wavelength, the higher the accuracy of the wavelength resolution. The reference light source 29 is, for example, a He-Ne gas laser of a 633 nm wavelength.

Figure 3:
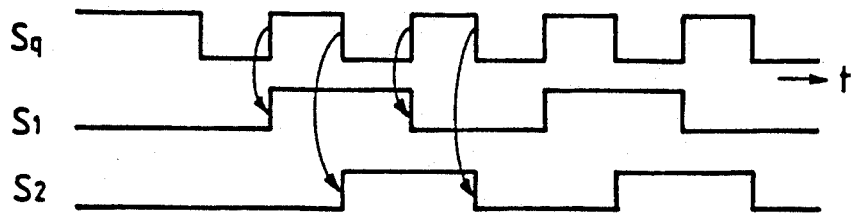
FIG. 3 is a timing chart showing the operation of a two-phase signal generator 32B used in the embodiment.

By the travel of the movable reflector 14 interference light, whose intensity varies repeatedly, is applied to the photodetector 31, by which it is converted into a sinusoidally-varying electric signal. The electric signal is applied to a waveform shaper 32A, by which it is shaped into a square wave signal Sq shown in FIG. 3. The square wave signal Sq is provided to a two-phase signal generator 32B, which serves as feedback signal generating means and derives therefrom two-phase signals $S_1$ and $S_2$ which are displaced 90° apart in phase from each other as depicted in FIG. 3. When the movable reflector 14 is at a standstill, the square wave signal Sq in FIG. 3 is at either one of the levels "0" and "1". When the movable reflector 14 moves at a constant speed, the square wave Sq of a fixed period is output from the waveform shaper 32A but this square wave Sq does not contain information on the direction of travel of the movable reflector 14. Then, according to the present invention, the control circuit 21 supplies the two-phase signal generator 32B with a direction control signal DC which specifies the direction in which to move the movable reflector 14. For example, in the case of driving the movable reflector 14 toward the beam splitter 12, the control circuit 21 controls the two-phase signal generator 32B to generate the two-phase signals $S_1$ and $S_2$ so that the signal $S_1$ leads the signal $S_2$ by a phase angle of 90°. In the case of driving the movable reflector 14 in the opposite direction, the signals $S_1$ and $S_2$ are produced so that the latter leads the former by a phase angle of 90°. The two-phase signals $S_1$ and $S_2$ are applied as feedback signals to the servo drive circuit 19.

The two-phase signals $S_1$ and $S_2$ are obtained by frequency-dividing the square wave signal Sq down to ½ the frequency. In accordance with the direction control signal DC the signals $S_1$ and $S_2$ are generated so that, for example, the former inverts its state upon each rise of the square wave signal Sq, whereas the latter inverts its state upon each fall of the signal Sq, as depicted in FIG. 3. The signal $S_1$ thus obtained at the rise of the square wave signal Sq in the example of FIG. 3 leads the signal $S_2$ obtained at the fall of the signal Sq, by a phase angle of 90°. When the movable reflector 14 moves in the opposite direction, the signal $S_2$ is generated so that it inverts the state upon each rise of the square wave signal Sq, whereas the signal $S_1$ is generated so that it inverts the state upon each fall of the signal Sq.

Figure 4:
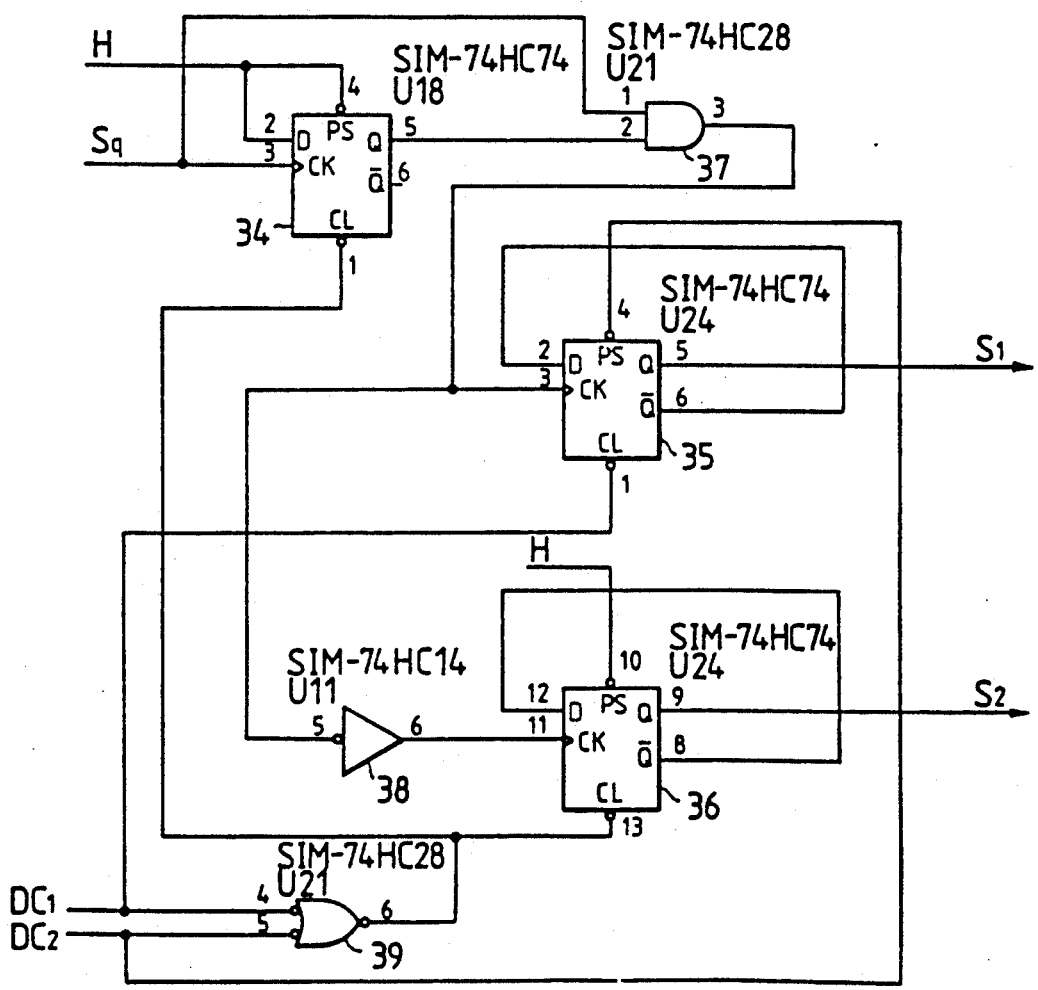
FIG. 4 is a circuit diagram illustrating a specific construction of the two-phase signal generator 32B.

FIG. 4 illustrates a specific example of the circuit construction of the two-phase signal generator 32B employed in the FIG. 2 embodiment. In this example the direction control signal DC from the control circuit 21 is composed of two signals $DC_1$ and $DC_2$ representing a predetermined direction and a direction opposite thereto, respectively. The signals $DC_1$ and $DC_2$ are applied to the two-phase signal generator 32B via different wires. In this example, however, the signals $DC_1$ and $DC_2$ are always at the high level, and when the movable reflector 14 is to be moved in either one of the directions, the corresponding one of the signals $DC_1$ and $DC_2$ is made low-level for a fixed short period of time. Here, the signals $DC_1$ and $DC_2$ refer to such low-level pulses. The two-phase signal generator 32B is made up of three D flip-flops 34, 35 and 36, an AND gate 37, an inverter 38 and a NOR gate 39. By the application of either one of the signals $DC_1$ and $DC_2$ corresponding to the direction of travel of the movable reflector 14 prior to the input of the square wave signal, the D flip-flops 34 and 36 are cleared and the D flip-flop 35 is cleared or preset by the signal $DC_1$ or $DC_2$.

The square wave signal Sq is applied to a clock terminal of the D flip-flop 34, which reads therein the high level provided at its data terminal to make its Q output high-level, and consequently the gate 37 is enabled, permitting the passage therethrough of the square wave signal Sq. As mentioned above, when either one of the signals $DC_1$ and $DC_2$ is applied, the D flip-flop 36 is cleared, by which its inverted Q output goes to the high level. Accordingly, at the first fall of the square wave signal Sq from the gate 37, the high level of its inverted Q output is read into the D flip-flop 36 and its Q output goes low, after which the level of the Q output reverses upon each fall of the square wave signal Sq. The Q output of the D flip-flop 36 is output as the two-phase signal $S_2$. On the other hand, if the D flip-flop 35 has been cleared by the signal $DC_1$ in advance, its inverted Q output is high, and at the first rise of the square wave signal Sq from the gate 37 the high level of the inverted Q output is read into the D flip-flop 35 to make its Q output high, after which the level of the Q output reverses upon each rise of the square wave signal Sq. Conversely, when the D flip-flop 35 has been preset by the signal $DC_2$, its inverted Q output remain low; so that at the first rise of the square wave signal Sq from the gate 37 the D flip-flop 35 reads thereinto the low level of the inverted Q output to make its Q output low, after which the level of the Q output reverses upon each rise of the square wave signal Sq. That is, the Q output in the latter case lags that in the former case by a phase angle of 180°. The Q output of the D flip-flop 35 is output as the other two-phase signal $DC_1$. That is, the two-phase signal generator depicted in FIG. 4 is designed to generate the signal $S_2$ which reverses its level upon each fall of the square wave signal Sq and the signal $S_1$ which reverses its level upon each rise of the square wave signal Sq and which leads or lags the signal $S_2$ by a phase angle of 90°, depending upon whether the applied direction signal is $DC_1$ or $DC_2$.

The FIG. 2 embodiment also permits servo control of the linear motor 16 through utilization of feedback signal generating means including scale means related directly to the movement of the reflector 14, i.e. the linear scale 17 in this example, during standstill period of the movable reflector 14 and/or during movement of the movable reflector 14 except during measurement, and the linear scale 17 and the linear scale detector 18 are also provided as in the prior art. The two-phase signal $D_1$, $D_2$ output from the linear scale detector 18 and the two-phase signal $S_1$, $S_2$ output from the two-phase signal generator 32B are changed over by a changeover circuit 33 under control of the control circuit 21 and applied to the servo drive circuit 19.

Even when the movable reflector 14 is held at a standstill, there is a fear that the movable reflector 14 is caused as by an external vibration to slightly shift relative to the beam splitter 12. This also causes the output level of the photodetector 31 to undergo a substantially sinusoidal variation with an intensity variation of the interference light, but the signal available from the output of the photodetector 31 does not contain information about the direction of movement of the movable reflector 14 as referred to previously. It is therefore impossible for the control circuit 21 to judge the direction in which to move the movable reflector 14 so as to correct its positioning error. In other words, the control circuit 21 cannot specify the direction control signal DC which is to be applied to the two-phase signal generator 32B. In view of this, in this embodiment the two-phase signal $D_1$, $D_2$ output of the linear scale detector 18 is provided via the changeover circuit 33 to the servo drive circuit 19 to control the movable reflector 14 to stand still.

Control for shifting the movable reflector 14 to its reference position upon turning-ON of the power source switch is effected by applying the two-phase signal $D_1$, $D_2$ from the linear scale detector 18, and the movable reflector 14 is moved until the light blocking plate 22 enters into the photo interrupter 23. The movement of the movable reflector 14 during measurement is also carried out by applying the output of the linear scale detector 18 to the servo drive circuit 19.

During measurement, since the signal DC for specifying the direction of movement of the movable reflector 14 is applied from the control circuit 21 to the two-phase signal generator 32B in advance, the two-phase signal $S_1$, $S_2$ of the phase corresponding to the direction of movement of the movable reflector 14 is output from the two-phase signal generator 32B as the movable reflector 14 moves, and the two-phase signal $S_1$, $S_2$ is applied to the servo drive circuit 19, by which the speed and distance of movement of the movable reflector 14 are controlled. Thus, the movement of the movable reflector 14 can be controlled with a high degree of accuracy. In the example of FIG. 2 the linear motor 16 is driven in units of the half wavelength of the reference light RL and the wavelength of the reference light RL is 633 nm; hence, the movable reflector 14 can be moved smoothly with high resolution. Upon completion of the driving of the linear motor 16 by the specified distance, the servo drive circuit 19 applies a movement end signal DE to the control circuit 21. When supplied with the movement end signal DE, the control circuit 21 applies a changeover control signal SW to the changeover circuit 33 to change its connection, providing the detected signal $D_1$, $D_2$ from the linear scale detector 18 to the servo drive circuit 19.

Even if the control step for the movable reflector 14 (i.e. the movement control unit) is sparse or long, no problems occur in the servo control for holding the movable reflector 14 at its standstill position and the servo control for moving the movable reflector 14 during the non-measurement period. Accordingly, the linear scale 17 may be a low-cost one whose resolution is low, for example, about 50 μm.

In the case where there is no fear of the movable reflector 14 moving from its standstill position, in particular, where the interferometer is mounted on a vibration-proof table which suppresses vibrations to less than $\frac{1}{4} \times 633$ nm, the linear scale 17, the linear scale detector 18 and the changeover circuit 33 may be omitted and the output $S_1$, $S_2$ of the two-phase signal generator needs to be applied directly to the servo drive circuit 19.

Figure 5:
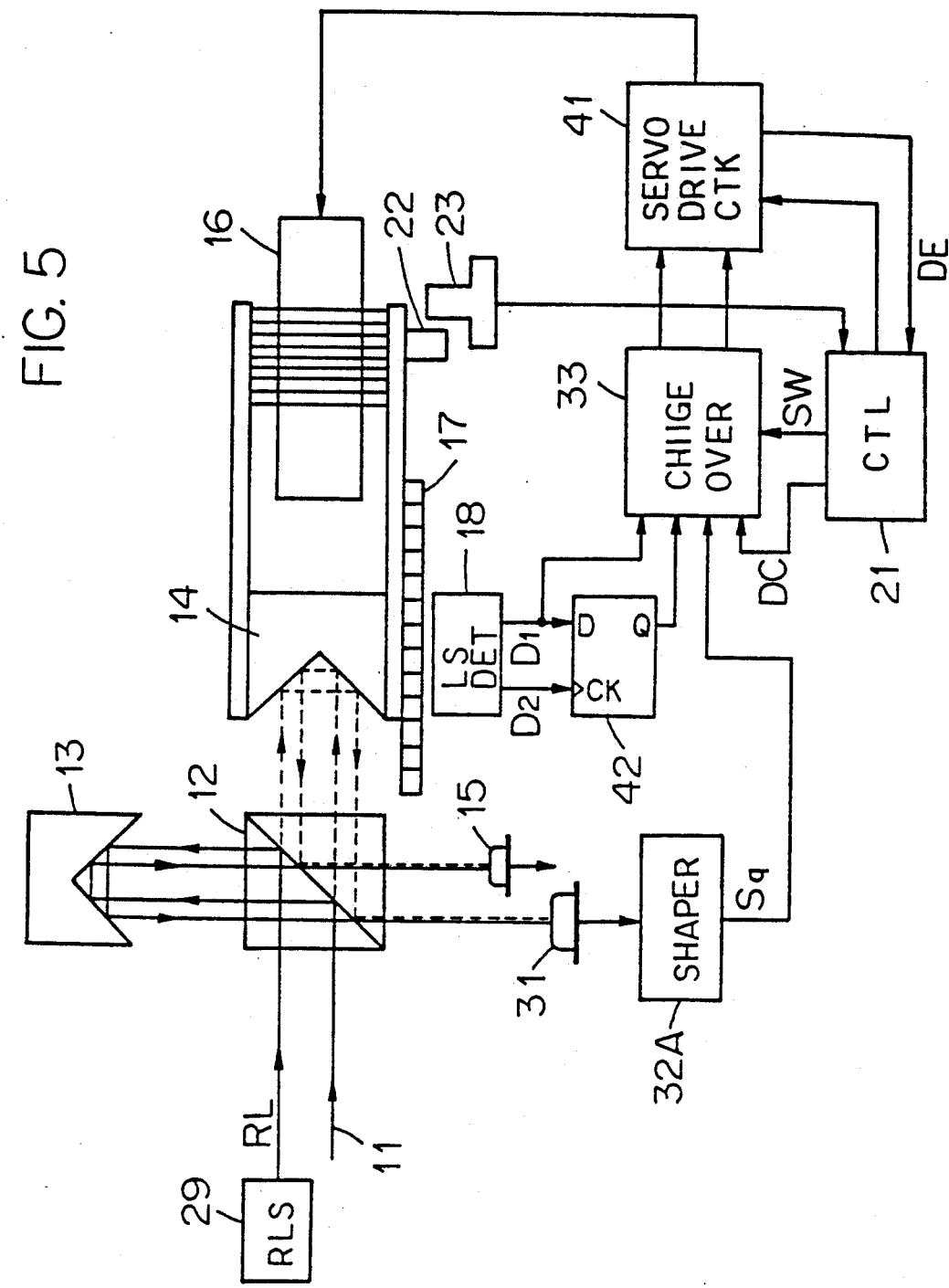
FIG. 5 is a block diagram illustrating another embodiment of the present invention.

While in the above the output of the waveform shaper 32A is converted into the two-phase feedback signals $S_1$ and $S_2$ of the phases corresponding to the direction control signal DC from the control circuit 20, it is also possible to effect servo control of the linear motor 16 by directly feeding back thereto the output Sq from the waveform shaper 32A, representing the distance of travel of the movable reflector, and the direction control signal DC from the control circuit 21 without involving the conversion to the two-phase signal, as shown in FIG. 5. In this instance, a known servo drive circuit 41 is employed which is supplied with a single-phase signal and a binary direction control signal as feedback signals thereto. In order to make the feedback signal from the linear scale detector 18 the same kind as the feedback signal from the photodetector 31, the one two-phase pulse signal $D_1$ from the linear scale detector 18 is applied, as a signal representing the amount of movement, to the changeover circuit 33 and a data terminal D of a D flip-flop 42, whereas the other two-phase pulse signal $D_2$ is applied to a clock terminal CK of the D flip-flop 42. The Q output of the flip-flop 42 goes to a "1" or "0" depending upon which of the two-phase pulses $D_1$ and $D_2$ leads the other in phase, and the Q output is provided as the direction control signal to the changeover circuit 33. Thus, it is possible to control the movement of the movable reflector 14 with high accuracy by feeding back the electric signal of the interference light of the reference light to the servo drive control circuit 41 and to hold the reflector at its standstill position by feeding back the detected output of the linear scale 17 to the servo drive circuit. Moreover, in the case of employing the servo drive circuit 41, a magnetic single-phase signal generator, or a photo-mechanical single-phase signal generator by a combination of a photo interrupter and a slit, as a scaler, and a movement-direction sensor such as a velocity sensor may be used in place of the linear scale 17 and the linear scale detector 18. In the above, a sine-wave signal may be used as the signal indicating the amount of movement.

In either of the embodiments shown in FIGS. 2 and 5, the linear scale 17 may be replaced with a two-phase or single-phase rotating scaler which responds to the linear movement of the movable reflector 14 to rotate a roller to drive a rotary encoder and supplied its output to the changeover circuit 33. Furthermore, it is also possible to employ an absolute value type scale which has, as a whole, the functions of the linear scale 17, the detector 18, the light blocking plate 22 and the photo interruptor 23. The movement of the movable reflector 14 is normally placed under servo control through use of the output of the photodetector 31 as the feedback signal, and when the control system is out of order, the output of the linear scale 17 is used to effect the servo control to prevent runaway of the movable reflector 14.

As described above, according to the present invention, a feedback signal corresponding to the movement of the movable reflector is derived from an electric signal converted from interference light of reference light and the feedback signal is applied to the servo drive circuit; so that the movement of the movable reflector can be implemented with very short steps without essentially affecting the interference light of the light to be measured. In addition, the present invention does not call for adding any optical parts to the conventional interferometer and hence does not involve complex adjustment, and the feedback signal generating means, for example, the two-phase signal generator 32B can easily be formed by an electric circuit. Consequently, there is no need of using an expensive linear scale of high resolution.

It will be apparent that many modifications and variations may be effected without departing from the scope of the novel concepts of the present invention.

I claim:

1. A Michelson interferometer comprising:
  a beam splitter for splitting incident light into reflected light and transmitted light;
  a fixed reflector fixed relative to said beam splitter, for reflecting one of said reflected light and said transmitted light back to said beam splitter;
  a movable reflector provided in a manner to be movable back and forth relative to said beam splitter, for reflecting the other of said reflected light and said transmitted light back to said beam splitter;
  motor means for linearly moving said movable reflector;
  servo drive means for driving said motor means, based on a feedback signal and a movement control signal;
  reference light source means for generating reference light of a fixed wavelength and applying said reference light as said incident light to said beam splitter;
  a photodetector which receives, from said beam splitter, light of interference between said reflected light from said fixed reflector and said reflected light from said movable reflector and which converts said interference light into an electric signal;
  first feedback signal generating means for generating a first feedback signal derived from said output electric signal of said photodetector;
  second feedback signal generating means including a scaler related directly to the movement of said movable reflector, for generating a second feedback signal corresponding to the movement of said movable reflector and of the same kind as said first feedback signal;
  changeover means which switches said first and second feedback signals and supplies one of said first and second feedback signals as said feedback signal to said servo drive means; and
  control means for generating and applying said movement control signal to said servo drive means and for controlling said changeover means so that when said movable reflector is in a moving state said first feedback signal is provided from said changeover means to said servo drive means and when said movable reflector is substantially in a stationary state said second feedback signal is provided from said changeover means to said servo drive means.

2. The Michelson interferometer of claim 1 wherein said first feedback signal generating means is two-phase signal generating means which derives from the output of said photodetector, as said first feedback signal, two-phase signals of the same period either one of which leads the other in phase in accordance with the direction specified by a direction control signal input from said control means and representing the direction in which to move said movable reflector and said second feedback signal generating means is means which includes a scaler and generates, as said second feedback signal, two-phase signals of the same period either one of which leads the other in phase in accordance with the direction of movement of said movable reflector, the period of said two-phase signals corresponding to a fixed amount of movement of said movable reflector.

3. The Michelson interferometer of claim 1 wherein said first feedback signal generating means outputs, as said first feedback signal, a single-phase signal derived from the output electric signal of said photodetector and a direction control signal input from said control means and representing the direction in which to move said movable reflector and said second feedback signal generating means is means which includes a scaler and generates, as said second feedback signal, a single-phase signal of a period corresponding to a fixed amount of movement of said movable reflector and an output resulting from the detection of the direction of movement of said movable reflector.

4. The Michelson interferometer of claim 3, wherein said two-phase signal generating means include a first flip-flop which is cleared or preset, depending on whether said direction control signal specifies the one direction or the other, and which frequency divides said electric signal down to $\frac{1}{2}$, and a second flip-flop which is cleared by said direction control signal, inverts said electric signal and frequency divides it down to $\frac{1}{2}$, the outputs of said first and second flip-flops being output as said two-phase signals.

* * * * *

UNITED STATES PATENT AND TRADEMARK OFFICE
CERTIFICATE OF CORRECTION

PATENT NO. : 5,270,790

DATED : DECEMBER 14, 1993

INVENTOR(S) : TAKASHI MATSUMURA

It is certified that error appears in the above-identified patent and that said Letters Patent is hereby corrected as shown below:

TITLE PAGE [22] "Apr. 7, 1991" should be --Apr. 17, 1991--.

Col. 3, line 21, "[$_r$/2." should be --$\lambda_r/2$.--.

Signed and Sealed this

Twenty-fourth Day of May, 1994

Attest:

Attesting Officer

BRUCE LEHMAN

*Commissioner of Patents and Trademarks*